US008219072B2

(12) United States Patent
Lovell, Jr.

(10) Patent No.: US 8,219,072 B2
(45) Date of Patent: Jul. 10, 2012

(54) SYSTEM AND METHOD FOR ENHANCED UAPROFILE MANAGEMENT

(75) Inventor: Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 980 days.

(21) Appl. No.: 12/139,066

(22) Filed: Jun. 13, 2008

(65) Prior Publication Data

US 2008/0311936 A1 Dec. 18, 2008

Related U.S. Application Data

(60) Provisional application No. 60/944,164, filed on Jun. 15, 2007.

(51) Int. Cl.
*H04M 3/42* (2006.01)
(52) U.S. Cl. .................. 455/414.4; 455/432.3
(58) Field of Classification Search .............. 455/414.1, 455/418, 450–453, 412.1, 432.3, 433; 707/609–780
See application file for complete search history.

(56) References Cited

U.S. PATENT DOCUMENTS

| 7,609,686 | B1 * | 10/2009 | McNamara et al. | 370/356 |
| 2003/0233461 | A1 * | 12/2003 | Mariblanca-Nieves et al. | 709/228 |
| 2004/0254905 | A1 * | 12/2004 | Tiku | 706/55 |
| 2008/0109528 | A1 * | 5/2008 | Knight et al. | 709/217 |

OTHER PUBLICATIONS

User Agent Profile Approved Version 2.0, Feb. 6, 2006 by Open Mobile Alliance.*
Wireless Application Group User Agent Profile Specification, Version Nov. 10, 1999, Nov. 10, 1999.*

* cited by examiner

*Primary Examiner* — Lester Kincaid
*Assistant Examiner* — Daniel Lai
(74) *Attorney, Agent, or Firm* — Edell, Shapiro & Finnan, LLC

(57) ABSTRACT

Given the growing number of Wireless Devices, and the increasingly varied characteristics (including for example screen size, color depth support, audio and video support, etc.) that Wireless Device vendors or manufacturers provide within their Wireless Devices, an infrastructure that various entities (such as for example Content Providers, Service Providers, etc.) may use to quickly retrieve a quality-controlled User Agent Profile based just on a Wireless Device's Telephone Number. The infrastructure may optionally leverage the capabilities of a centrally-located Messaging Inter-Carrier Vendor.

5 Claims, 3 Drawing Sheets

SYSTEM AND METHOD FOR ENHANCED UAPROFILE MANAGEMENT

This application claims the benefit of U.S. Provisional Patent Application No. 60/944,164, filed on Jun. 15, 2007, which is herein incorporated by reference in its entirety.

BACKGROUND

1. Field of the Invention

The present invention relates generally to telecommunications services. More particularly, the present invention relates to capabilities that enhance substantially the value and usefulness of various messaging paradigms including, inter alia, Multimedia Message Service (MMS), Internet Protocol (IP) Multimedia Subsystem (IMS), etc.

2. Background of the Invention

As the 'wireless revolution' continues to march forward the importance to a Mobile Subscriber (MS), for example a user of a Wireless Device (WD) such as a mobile telephone, a BlackBerry, etc. that is serviced by a Wireless Carrier (WC), of their WD grows substantially.

One consequence of such a growing importance is the resulting ubiquitous nature of WDs—i.e., MSs carry them at almost all times, use them for an ever-increasing range of activities, and (not unreasonably) expect them to operate properly under all circumstances.

The realization of the 'operate properly under all circumstances' expectation that was noted above is becoming increasingly more difficult. For example:

1) WDs are all different—e.g., the vendors or manufacturers of WDs (such as, for example, Motorola, Samsung, Nokia, LG, etc.) supply their WDs with different size screens, support for different color depths, varying degrees of support for audio and video information, etc.

2) The WD differences that were noted above mean, possibly inter alia, that content—e.g., images, video, audio, etc. containing anything and everything from news alerts, traffic updates, stock information, movie clips, TV shows, etc.—that is crafted for one WD may not work (e.g., may not be viewable, etc.) on another WD.

3) With the increasing delivery of content to WDs, and with the charging of not inconsiderable amounts of money for same, an important threshold question arises for a provider of content—e.g., a Content Provider (CP), a Service Provider (SP), etc.—i.e., how can the provider know the unique characteristics of a specific WD so that they can, possibly inter alia, tailor their content to those characteristics so that the MS, when they receive the content on their WD, will enjoy a positive user experience?

Fortunately a standard description of a WD does exist—a User Agent Profile (UAProfile) as defined by the World Wide Web Consortium (W3C). A UAProfile is a small Extensible Markup Language (XML) file that describes the particulars of a WD. A UAProfile may include, possibly inter alia, details for vendor, model, screen size, multimedia capabilities, character set support, etc.

Unfortunately the publicly available UAProfiles (at, for example, sites such as www.uaprofile.com) may contain incorrect information or be unavailable entirely; the retrieval of a UAProfile may be quite time consuming; etc.

Even though a provider of content may have access to a repository of UAProfiles, they face an additional impediment to being able to learn about the particulars of a WD of interest—i.e., if a CP, SP, etc. knows just the Telephone Number (TN) of a WD of interest, how can the CP, SP, etc. determine from the TN the manufacturer, model, etc. of the WD so that they can then (at least try to) retrieve the WD's UAProfile from a repository?

The challenges that were described above highlight the need for an infrastructure that CPs, SPs, etc. may use to quickly retrieve quality-controlled UAProfiles based just on a WD's TN.

The present invention provides such an (enhanced UAProfile access and management) infrastructure and addresses various of the (not insubstantial) challenges that are associated with same.

SUMMARY OF THE INVENTION

In one embodiment of the present invention there is provided a method for User Agent Profile (UAProfile) access, including receiving a request message from a requestor said request message including at least a device address, performing one or more processing steps on said request message including at least a query of a User Agent Profile repository based on said device address yielding a retrieved User Agent Profile, generating a response message said response message including at least aspects of said retrieved User Agent Profile, and returning said response message to said requester.

In accordance with an embodiment the request message includes an XML document that may be received through one of (a) the World Wide Web, (b) a wireless message, (c) electronic mail, (d) a data feed, or (e) an Application Programming Interface. The request message may also be received as (a) a Short Message Service message or (b) a Multimedia Message Service message. The response message may be similarly configured.

In a preferred method the device address is a telephone number, which may be E.164 compliant.

When a query fails the method may further include (a) determining information about the device that is associated with said device address, (b) retrieving a User Agent Profile for said device based at least on aspects of said information, and (c) updating said User Agent Profile repository based on aspects of said retrieved User Agent Profile.

The information may include includes one or more of device model, device vendor, and device capabilities.

In another possible embodiment, a method of providing information about a wireless device, includes receiving a request from an entity for information about a wireless, the request including a telephone number of the wireless device, determining a wireless carrier that serves the wireless device associated with the telephone number, querying the wireless carrier for the information about the wireless device, receiving the information about the wireless device from the wireless carrier, adding the information about the wireless device to a Profile repository, and providing the information about the wireless device to the entity.

In a particular implementation, the request is received at an inter-carrier vendor that is neither the wireless carrier nor the entity from which the request was received.

These and other features of the embodiments of the present invention, along with their attendant advantages, will be more fully appreciated upon a reading of the following detailed description in conjunction with the associated drawings.

It should be understood that these figures depict embodiments of the invention. Variations of these embodiments will be apparent to persons skilled in the relevant art(s) based on the teachings contained herein.

DETAILED DESCRIPTION

Aspects of the present invention may be offered as a value-add service by a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of a MICV, a summary of various of the services/functions/etc. that are performed by a MICV, and a discussion of the numerous advantages that arise from same. The disclosure of U.S. Pat. No. 7,154,901, along with its associated continuations, is incorporated herein by reference.

Figure 1:
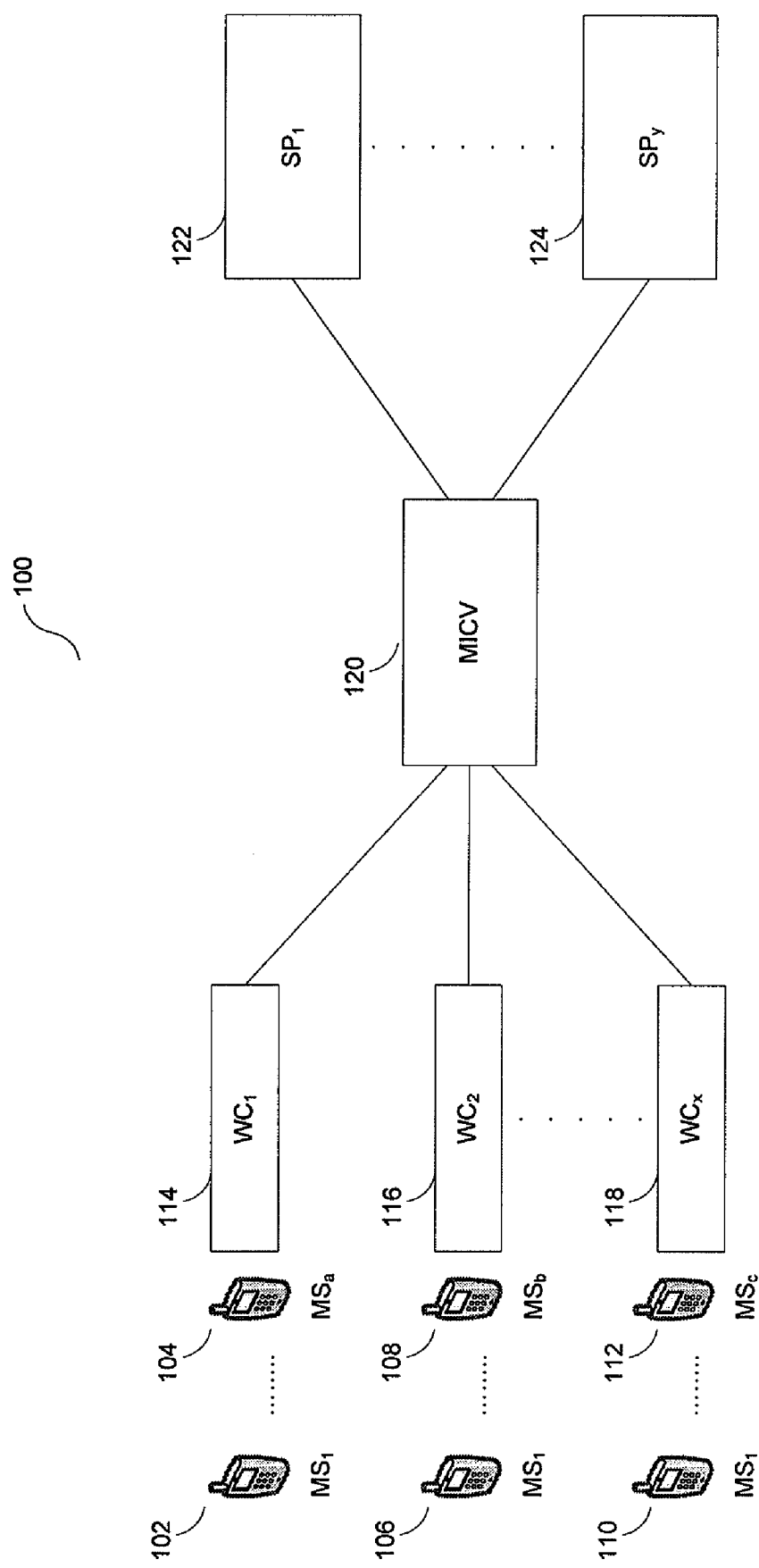
FIG. 1 is a diagrammatic presentation of an exemplary Messaging Inter-Carrier Vendor (MICV).

As illustrated in FIG. 1 and reference numeral 100 a MICV 120 is disposed between, possibly inter alia, multiple WCs ($WC_1$ 114→$WC_x$ 118) on one side and multiple SPs ($SP_1$ 122→$SP_y$ 124) on the other side and thus 'bridges' all of the connected entities. A MICV 120 thus, as one simple example, may offer various routing, formatting, delivery, value-add, etc. capabilities that provide, possibly inter alia:

1) A WC 114→1118 (and, by extension, all of the MSs 102→104, 106→108, 110→112 that are serviced by the WC 114→1118) with ubiquitous access to a broad universe of SPs 122→124, and 2) A SP 122→124 with ubiquitous access to a broad universe of WCs 114→118 (and, by extension, to all of the MSs 102→104, 106→108, 110→112 that are serviced by the WCs 114→118).

Generally speaking a MICV may have varying degrees of visibility (e.g., access, etc.) to the (MS←→MS, MS←→SP, etc.) messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While aspects of the present invention may be offered a MICV, it will be readily apparent to one of ordinary skill in the relevant art that numerous other arrangements are equally applicable (e.g., aspects of the present invention may be offered by a third-party service bureau, an element of a WC or a landline carrier, multiple third-party entities working together, etc.) and indeed are fully within the scope of the present invention.

Figure 2:
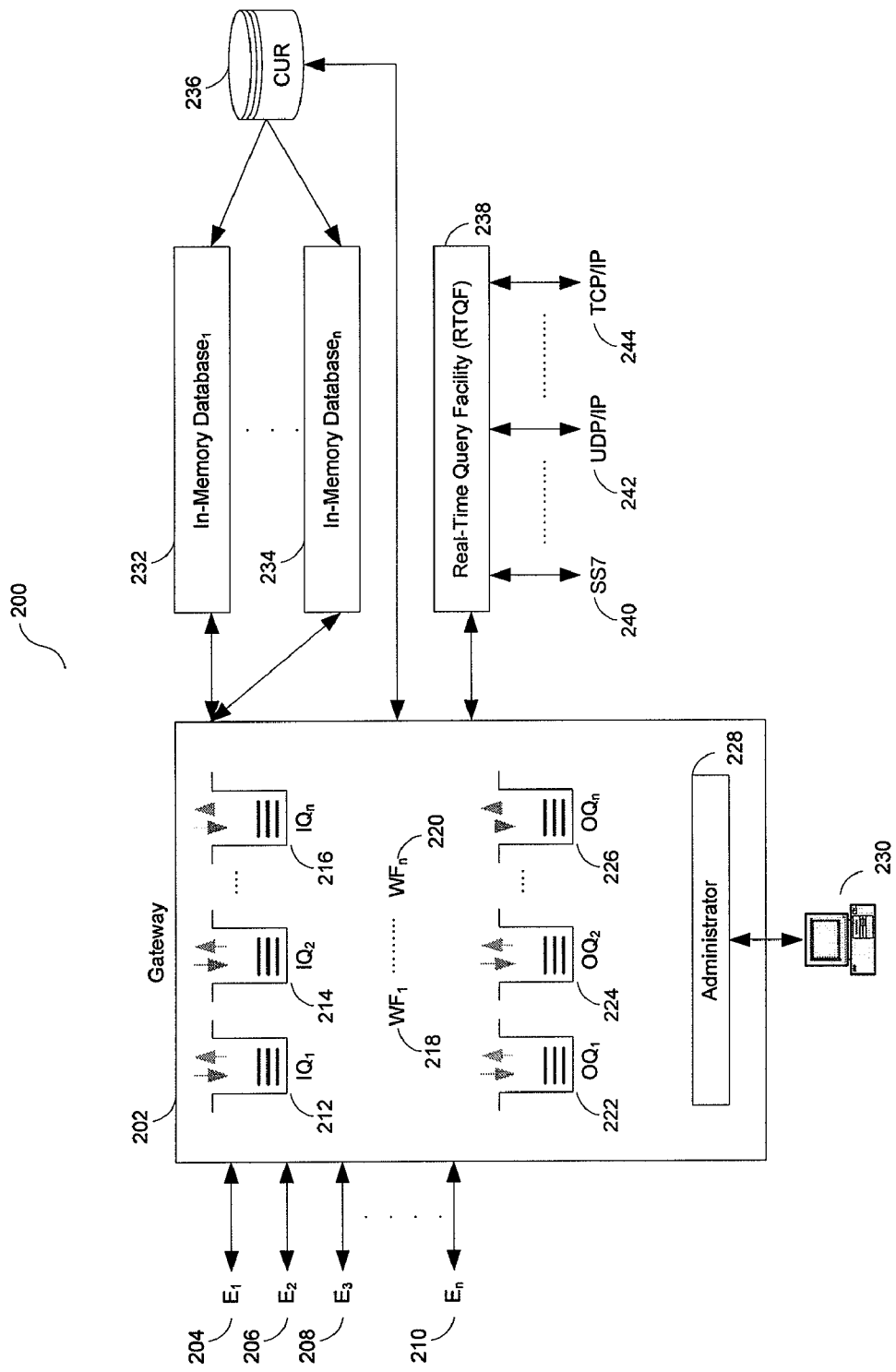
FIG. 2 illustrates one embodiment that that is possible for aspects of the present invention.

FIG. 2 and reference numeral 200 provide a high-level depiction of one embodiment that is possible for aspects of the present invention. The depiction in FIG. 2 contains several key components, including:

1) Entities ($E_1$ 204, $E_2$ 206, ... $E_n$ 210). Parties such as, possibly inter alia, a CP, a SP, a WC, etc. that wish to make use of aspects of the present invention. An entity, possibly inter alia, connects to and interacts with a Gateway 202.

2) A Gateway 202. A dynamically updateable set of one or more software processes (not explicitly depicted in the diagram) handle incoming (request, etc.) traffic and outgoing (response, etc.) traffic. Incoming traffic is accepted and deposited on an intermediate or temporary Incoming Queue ($IQ_1$ 212→$IQ_n$ 216 in the diagram) for subsequent processing. Processed artifacts are removed from an intermediate or temporary Outgoing Queue ($OQ_1$ 222→$OQ_n$ 226 in the diagram) and then dispatched.

3) Incoming Queues ($IQ_1$ 212→$IQ_n$ 216). A dynamically updateable set of one or more IQs ($IQ_1$ 212→$IQ_n$ 216) operate as intermediate or temporary buffers for incoming traffic.

4) WorkFlows ($WF_1$ 218→$WF_n$ 220). A dynamically updateable set of one or more WFs ($WF_1$ 218→$WF_n$ 220) remove incoming traffic from an intermediate or temporary IQ ($IQ_1$ 212→$IQ_n$ 216 in the diagram), perform all of the required processing operations, and deposit processed artifacts on an intermediate or temporary OQ ($OQ_1$ 222→$OQ_n$ 226 in the diagram). The WorkFlow component will be described more fully below.

5) Outgoing Queues ($OQ_1$ 222→$OQ_n$ 226). A dynamically updateable set of one or more OQs ($OQ_1$ 222→$OQ_n$ 226 in the diagram) operate as intermediate or temporary buffers for outgoing traffic.

6) An Administrator 228. An Administrator 228 provides, possibly inter alia, management or administrative control over all of the different system components (e.g., IQs [$IQ_1$ 212→$IQ_n$ 216], WFs [$WF_1$ 218→$WF_n$ 220], OQs [$OQ_1$ 222→$OQ_n$ 226], etc.); support for the manual and/or the automatic review, editing, addition, deletion, etc. of individual UAProfiles and/or groups of UAProfiles; etc. An Administrator 228 may provide, as one example, a Web-based interface 230; it will be readily apparent to one of ordinary skill in the relevant art that numerous other interfaces (e.g., a data feed, an Application Programming Interface [API], etc.) are easily possible.

7) In-Memory Databases (In-Memory $Database_1$ 232→In-Memory $Database_n$ 234). A dynamically updateable set of one or more instances of an in-memory database facility (In-Memory $Database_1$ 232→In-Memory $Database_n$ 234 in the diagram) may provide, possibly inter alia, very high-performance access to aspects of the information that is maintained in a Composite UAProfile Repository (CUR) 236.

8) A Real-Time Query Facility (RTQF) 238. When it is necessary to retrieve vendor, model, etc. information about a WD (from, for example, a WC's Home Location Register [HLR], from one or more WC repositories, from vendor or manufacturer repositories, from various public sources, etc.) and/or a UAProfile (from, for example, any number of public sources [such as, for example, www.uaprofile.com]; any number of private sources provided by WCs, handset vendors or manufacturers, and others; etc.) a RTQF 238 may employ any combination of one or more channels such as Signaling System Number Seven (SS7) 240, User Datagram Protocol (UDP)/IP 242, Transmission Control Protocol (TCP)/IP 244, etc. to complete such retrievals (using, possibly inter alia, any combination of an SS7 message exchange, an MMS message exchange, a Short Message Peer-to-Peer [SMPP] message exchange, etc.).

9) A Composite UAProfile Repository (CUR) 236. A consolidated repository that maintains, possibly inter alia, for each TN a (possibly inter alia retrieved, checked or examined, etc.) UAProfile.

It will be readily apparent to one of ordinary skill in the relevant art that numerous other components and/or numerous alternative component arrangements are possible. For example:

1) The different database environments that are depicted in FIG. 2—e.g., the In-Memory Databases (In-Memory $Database_1$ 232→In-Memory $Database_n$ 234) and the CUR 236—are logical representations of the possibly multiple physical repositories that might be implemented. The physical repositories may be implemented through any combination of conventional Relational Database Management Systems (RDBMSs) such as Oracle, through Object Database Management Systems (ODBMSs), through in-memory Database Management Systems (DBMSs), or through any other equivalent facilities.

2) A Gateway 202 may maintain a repository (e.g., a database) into which selected details of all administrative, request, processing, response, etc. activities may be recorded. Among other things, such a repository may be used to support scheduled (e.g., daily, weekly, etc.) and/or on-demand reporting with report results delivered (to, for example, an Entity [$E_1$ 204, $E_2$ 206, . . . $E_n$ 210]) through, possibly inter alia, any combination of one or more channels such as the World Wide Web (WWW via, for example, a dedicated Web site), wireless messaging (Short Message Service [SMS], MMS, etc.), Electronic Mail (E-Mail) messages, Instant Messaging (IM), conventional mail, telephone, Interactive Voice Response (IVR) facility, etc.

As depicted in FIG. 2, various entities ($E_1$ 204, $E_2$ 206, . . . $E_n$ 210) may connect to and interact with a Gateway 202. A connection to a Gateway 202 may be completed over, possibly inter alia, a private or dedicated circuit, the open Internet, via a secured or encrypted channel, etc. An entity may need to submit previously-secured access credentials (such as, possibly inter alia, an identifier and a password) in order to gain access to a Gateway 202.

A connected and allowed (e.g., authenticated, etc.) entity ($E_1$ 204, $E_2$ 206, . . . $E_n$ 210) may submit to a Gateway 202 a request containing, possibly inter alia, a TN (e.g., of a WD of interest). A request may be submitted over any combination of one or more channels such as the WWW, wireless messaging (e.g., SMS, MMS, etc.), E-Mail, IM, an API, a data feed, etc. A TN may be formatted as, possibly inter alia, an International Telecommunication Union (ITU) E.164-compliant value (e.g., +17035551212). A request may consist of, possibly inter alia, an XML document; for example:

<Request><Address>+17035551212</Address></Request>

Through flexible, extensible, and dynamically updatable configuration information a WF component may be quickly and easily realized to support any number of activities. For example, WFs might be configured to support various internal processing steps (please see below); to support the generation and dispatch of response, etc. messages; to support various billing transactions; to support the generation of scheduled and/or on-demand reports; etc. The specific WFs that were just described are exemplary only; it will be readily apparent to one of ordinary skill in the relevant art that numerous other WF arrangements, alternatives, etc. are easily possible.

An illustrative internal processing sequence, that may be realized as a WF, might include the following steps:

1) From a received request extract (and, possibly inter alia, edit check and validate) the included TN (e.g., +17035551212).

2) Does the CUR contain an entry for the TN (e.g., +17035551212)? If no then add a new (e.g., empty) entry to the CUR for the TN and proceed to step 4.

3) Does the TN entry in the CUR have associated with it a (possibly inter alia current, valid, unexpired, etc.) UAProfile? If yes then proceed to step 7.

4) A UAProfile needs to be retrieved.

A) Authoritatively determine the specific WC that services the TN. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of a comprehensive Message Routing Subsystem (MRS) that provides, among other things, support for the authoritative determination of a servicing WC given a TN (a) for any country (i.e., any TN numbering scheme) around the world and (b) that fully accounts for complexities such as Mobile Number Portability (MNP) regimes.

B) Based on various criteria (including, possibly inter alia, the identified WC, that WC's preferences, specific arrangements that exist with that WC, etc.) use any combination of one or more channels such as SS7 240, UDP/IP 242, TCP/IP 244, etc. to retrieve (e.g., from a WC's HLR, from one or more WC repositories, from vendor or manufacturer repositories, from various public sources, etc.) information about the WD that is associated with the TN. Such a retrieval may be completed using any combination of, possibly inter alia, an SS7 message exchange, an MMS message exchange, a SMPP message exchange, etc.

C) Based on the retrieved WD information identify the vendor, model, etc. of the WD. If no WD information is retrievable then default (e.g., "Unavailable") information may optionally be employed for, possibly inter alia, the vendor, model, etc. of the WD.

D) Based on the gathered vendor, model, etc. information retrieve the required UAProfile (e.g., from any number of public sources [such as, for example, www.uaprofile.com]; from any number of private sources provided by WCs, handset vendors or manufacturers, and others; etc.). If no UAProfile is retrievable then a default UAProfile (containing default, empty, etc. data elements) may optionally be created (and, possibly inter alia, subsequently populated with 'real' data during a quality control process).

5) Store the UAProfile in the CUR by, possibly inter alia, associating it to the instant TN entry in the CUR.

6) Optionally perform one or more manual and/or automatic quality control checks on the UAProfile and all of the data elements in the UAProfile. Individual data elements in a UAProfile may be added, corrected, augmented, etc. as appropriate and as required. Actual WDs may optionally be employed during portions of the quality control process.

Figure 3:
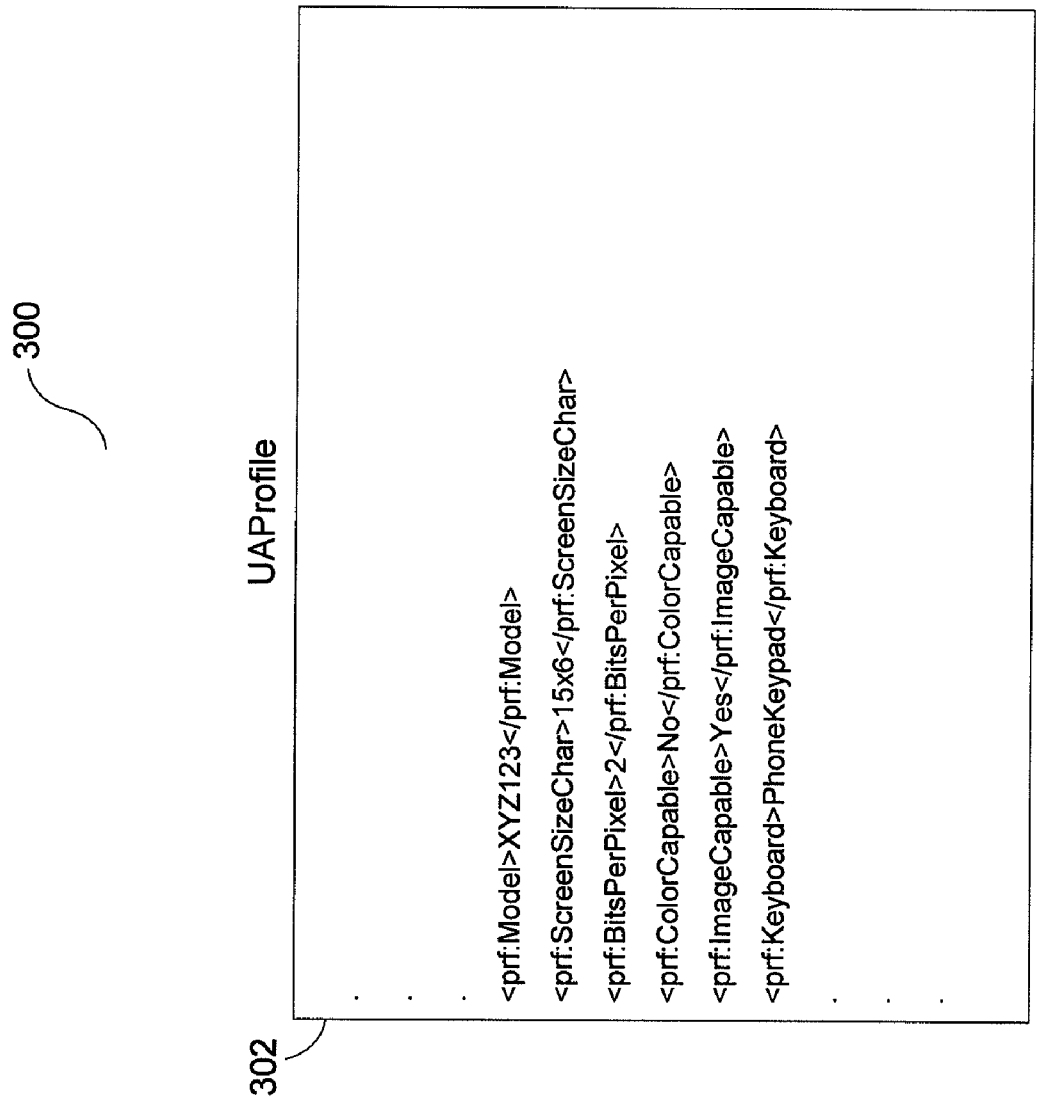
FIG. 3 illustrates aspects of a hypothetical UAProfile.

7) Return a response containing the UAProfile. For purposes of illustration a portion of a hypothetical UAProfile 302 is presented in FIG. 3 (and reference numeral 300).

A response may be returned using any combination of one or more channels such as the WWW, wireless messaging (e.g., SMS, MMS, etc.), E-Mail, IM, an API, a data feed, etc.

The specific processing activities that were described above are illustrative only and it will be readily apparent to one of ordinary skill in the relevant art that numerous other processing activities are easily possible and indeed are fully within the scope of the present invention. For example:

1) A UAProfile is locally cached by associating it to a TN in a CUR. Such a cached UAProfile may be subsequently managed. For example, possibly inter alia, a cached UAProfile may be 'expired' at some point based on certain (e.g., age, validity, etc.) characteristics or parameters.

During the processing steps that were described above one or more billing transactions may optionally be completed—e.g., for each request that is received, for various of the processing steps that are performed, for each response returned, etc. A billing transaction may take any number of forms and may involve different external entities (e.g., a WC's billing system, a carrier billing system service bureau, a credit or debit card clearinghouse, etc.). A billing transaction may include, possibly inter alia:

1) The appearance of a line item charge on the bill or statement that an Entity may receive from their WC. Exemplary mechanics and logistics associated with this approach are described in pending U.S. patent application Ser. No. 10/837,695 entitled "SYSTEM AND METHOD FOR BILLING AUGMENTATION." Other ways of completing or performing line item billing are easily implemented by those skilled in the art.

2) The charging of a credit card or the debiting of a debit card.

3) The charging of an internal account.

If wireless messaging (e.g., SMS, MMS, etc.) is utilized for the submission of requests and/or the return of responses then various of those messages may employ a Short Code (SC) or a regular TN as its address. While the abbreviated length of a SC (e.g., five digits for a SC administered by Neustar under the Common Short Code [CSC] program) incrementally enhances the experience of a MS (e.g., the MS need remember and enter only a few digits as the destination address of a reply message) it also, by definition, constrains the universe of available SCs thereby causing each individual SC to be a limited or scarce resource and raising a number of SC/CSC management, etc. issues. A description of a common (i.e., universal) short code environment may be found in pending U.S. patent application Ser. No. 10/742,764 entitled "UNIVERSAL SHORT CODE ADMINISTRATION FACILITY."

The requests, responses, etc. that were described above may optionally contain an informational element—e.g., a relevant or applicable factoid, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a Location-Based Service [LBS] facility).

The requests, responses, etc. may optionally contain advertising—e.g., textual material if a simple channel is being utilized, or multimedia (images of brand logos, sound, video snippets, etc.) material if a more capable channel is being utilized. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a LBS facility).

The requests, responses, etc. may optionally contain promotional materials (e.g., still images, video clips, etc.).

The discussion that was just presented referenced the specific wireless messaging paradigms MMS and IMS. These paradigms potentially offer an incremental advantage over other paradigms; for example, native support for MMS is commonly found on a WD that a potential MS would be carrying. However, it is to be understood that it would be readily apparent to one of ordinary skill in the relevant art that other paradigms are fully within the scope of the present invention.

The discussion that was just presented referenced a specific WD descriptor—i.e., a UAProfile. However, it is to be understood that it would be readily apparent to one of ordinary skill in the relevant art that other WD descriptors are easily possible and indeed are fully within the scope of the present invention.

It is important to note that the hypothetical example that was presented above, which was described in the narrative and which was illustrated in the accompanying figures, is exemplary only. It is not intended to be exhaustive or to limit the invention to the precise forms disclosed. It will be readily apparent to one of ordinary skill in the relevant art that numerous alternatives to the presented example are easily possible and, indeed, are fully within the scope of the present invention.

The following list defines acronyms as used in this disclosure.

| Acronym | Meaning |
| --- | --- |
| API | Application Programming Interface |
| CP | Content Provider |
| CSC | Common Short Code |
| CUR | Comprehensive UAProfile Repository |
| DBMS | Database Management System |
| E-Mail | Electronic Mail |
| HLR | Home Location Register |
| IM | Instant Messaging |
| IMS | IP Multimedia Subsystem |
| IP | Internet Protocol |
| IQ | Incoming Queue |
| ITU | International Telecommunication Union |
| IVR | Interactive Voice Response |
| LBS | Location-Based Service |
| MICV | Messaging Inter-Carrier Vendor |
| MMS | Multimedia Message Service |
| MNP | Mobile Number Portability |
| MRS | Message Routing Subsystem |
| MS | Mobile Subscriber |
| ODBMS | Object Database Management System |
| OQ | Outgoing Queue |
| RDBMS | Relational Database Management System |
| RTQF | Real-Time Query Facility |
| SC | Short Code |
| SMPP | Short Message Peer-to-Peer |
| SMS | Short Message Service |
| SP | Service Provider |
| SS7 | Signaling System Number Seven |
| TCP | Transmission Control Protocol |
| TN | Telephone Number |
| UAProfile | User Agent Profile |
| UDP | User Datagram Protocol |
| W3C | WWW Consortium |
| WC | Wireless Carrier |
| WD | Wireless Device |
| WF | WorkFlow |
| WWW | World Wide Web |
| XML | Extensible Markup Language |

What is claimed is:

1. A method of providing information about a wireless device, comprising:
   receiving a request from a content provider for User Agent Profile information about a wireless device, the request including a telephone number of the wireless device;
   determining a wireless carrier that serves the wireless device associated with the telephone number;
   querying the wireless carrier for the User Agent Profile information about the wireless device;
   receiving the User Agent Profile information about the wireless device from the wireless carrier;
   adding the User Agent Profile information about the wireless device to a Profile repository; and
   providing the User Agent Profile information about the wireless device to the content provider.

2. The method of claim 1, wherein the request is received at an inter-carrier vendor that is neither the wireless carrier nor the content provider.

3. The method of claim 1, further comprising querying the Profile repository for the information about the wireless device.

4. The method of claim 1, wherein the information includes a model of the wireless device, a screen size of the wireless device, an image capability of the wireless device, or keyboard type of the wireless device.

5. The method of claim 1, wherein the request comprises an XML document.

* * * * *